H. W. WEED.
FOLDING BACK.
APPLICATION FILED SEPT. 6, 1917.

1,272,159.

Patented July 9, 1918.

WITNESSES

INVENTOR
H.W. Weed

BY

ATTORNEYS

UNITED STATES PATENT OFFICE.

HOWARD W. WEED, OF STAMFORD, CONNECTICUT.

FOLDING BACK.

1,272,159.

Specification of Letters Patent.

Patented July 9, 1918.

Original application filed January 4, 1917, Serial No. 140,592. Divided and this application filed September 6, 1917. Serial No. 189,995.

*To all whom it may concern:*

Be it known that I, HOWARD W. WEED, a citizen of the United States, and a resident of Stamford, in the county of Fairfield and State of Connecticut, have invented a new and Improved Folding Back, of which the following is a full, clear, and exact description, this being a division of the application for Letters Patent for a folding back, Serial No. 140,592, filed by me on January 4, 1917.

The object of the invention is to provide a new and improved folding back for motor cycles, bicycles and like machines and devices, arranged to permit the rider to readily swing the folding back into an approximately horizontal position for mounting and dismounting purposes and to swing the folding back into upright position for supporting the back of the rider.

In order to accomplish the desired result, use is made of a support held on the saddle, a back mounted to swing on the said support from upright to horizontal position and vice versa, a combined catch and releasing lever fulcrumed on the said back and having a handle, and coöperating means on the said lever and the said support to lock the back in upright position and to allow of releasing the back for the latter to swing into horizontal position.

A practical embodiment of the invention is represented in the accompanying drawings forming a part of this specification in which similar characters of reference indicate corresponding parts in all the views.

Figure 1 is a side elevation of the folding back as applied to a motor cycle and disposed in horizontal position for mounting and dismounting purposes;

Fig. 2 is a similar view of the same with the folding back disposed in upright position for supporting the back of the rider;

Fig. 3 is a rear elevation of the same; and

Fig. 4 is a side elevation of a modified form of the folding back.

The saddle 10 of a motor cycle, bicycle or a similar machine 11 is of any approved construction and is provided at its rear with a support 12 provided with pivots 13 for the side arms 14 of the back 15 to swing on from normal upright position (see Figs. 2 and 3) to an approximately horizontal position (see Fig. 1) or vice versa. The back 15 is provided at its upper end with the usual back rest 16 connecting the side arms 14 with each other. The axes of the pivots 13 extend transversely and coincide. The support 12 is provided with lugs 17 adapted to be engaged by catches 18 formed on the forward end of a combined catch and releasing lever 19 fulcrumed at 20 on the side arms 14 of the back 15. The combined catch and releasing lever 19 is provided with a handle 21 and springs 22 to connect the side arms 14 with the lever 19 at a point intermediate the pivots 13 and 20. It will be noticed that when the back 15 is in upright position, as shown in Figs. 2 and 3, it is held against rearward movement thereof by the catches 18 engaging the lugs 17, but when it is desired to swing the back 15 into an approximately horizontal position it is only necessary for the rider to take hold of the handle 21 and to press the same rearwardly and downwardly to impart an upward swinging movement to the combined catch and releasing lever 19 so that the catches 18 move out of engagement with the lugs 17 thus unlocking the back 15, and then by a further downward pull on the handle 21 the back 15 is caused to swing downwardly and rearwardly into an approximately horizontal position, as plainly shown in Fig. 1. The downward and rearward swinging movement of the back 15 is limited by stops 23 formed on the support 12 and forming a rest for the side arms 14 of the back 15. When it is desired to return the back 15 to vertical supporting position then the operator takes hold of the handle 21 and moves the same upwardly and forwardly thus imparting an upwardly and forwardly swinging movement to the back 15, and when the latter reaches an upright position the catches 18 reëngage the lugs 17. It will be noticed that when the back 15 is in upright position it is held against rearward and downward swinging movement by the combined catch and releasing lever 19 at the time the back is pressed on by the rider leaning against the back rest 16.

In the modified form shown in Fig. 4, the support 50 is provided with a pivot 51 on which swings the back 52 provided at its lower end with an extension arm 53 on which is pivoted at 54 a combined catch and releasing lever 55. The combined catch and releasing lever 55 is provided with a rearwardly extending catch 56 engaging a lug 57 formed on the support 50 to hold the back 52 locked in upright position. The combined catch and releasing lever 55 is provided with an upwardly and rearwardly extending handle 58 pressed on by a spring 59 attached to the back 52. When it is desired to swing the back 52 into an approximately horizontal position, the operator presses the handle 58 forwardly to disengage the catch 56 from the lug 57 whereby the back 52 is unlocked to permit swinging the back down into horizontal position. On swinging the back upwardly and forwardly into upright position the catch 56 engages the lug 57 to hold the back 52 locked against downward movement thereby forming a firm support for the back of the rider.

From the foregoing it will be seen that the folding back is very simple and durable in construction and composed of comparatively few parts, not liable to get out of order easily. It will also be seen that the construction disclosed is very simple owing to the use of the combined catch and releasable lever.

Having thus described my invention, I claim as new and desire to secure by Letters Patent:

1. A folding back for the saddle of a motor cycle, bicycles and like machine, comprising a support secured to and projecting from the rear of the saddle, said support having a lug, a back mounted to swing on the said support from upright to horizontal position and vice versa, a combined catch and releasing lever mounted on the said back and having a handle and adapted to engage the stop, and a spring secured to the back and in engagement with the said catch, the handle of the catch also serving to swing the back into upright and horizontal positions.

2. A folding back for the saddle of a motor cycle, bicycle and like machine, comprising a support secured to and projecting from the rear of the saddle, said support being provided with a lug and rearwardly projecting stops, a back pivoted to the support adjacent the stops to swing on the said support from upright to horizontal position and vice versa, said back engaging the stops when in horizontal position, a lever pivoted on the said back intermediate of its ends, said lever having at one end a catch for engaging the lug of the support and at its other end a handle for disengaging the catch from the lug of the support and swinging the back into upright and horizontal positions, and a coil spring having one end secured to the lever and its other end to the back.

HOWARD W. WEED.

Copies of this patent may be obtained for five cents each, by addressing the "Commissioner of Patents, Washington, D. C."